Patented June 1, 1948

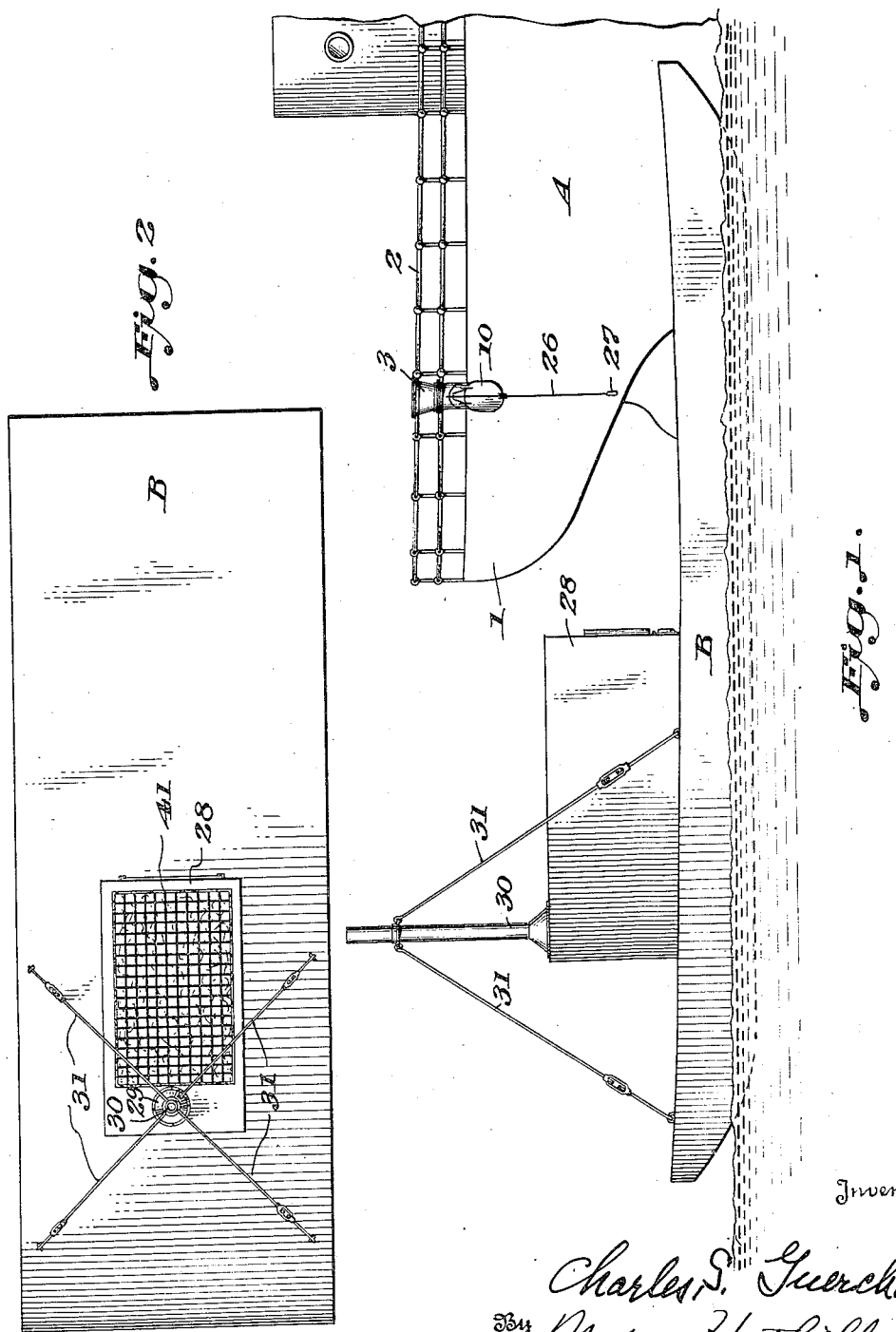

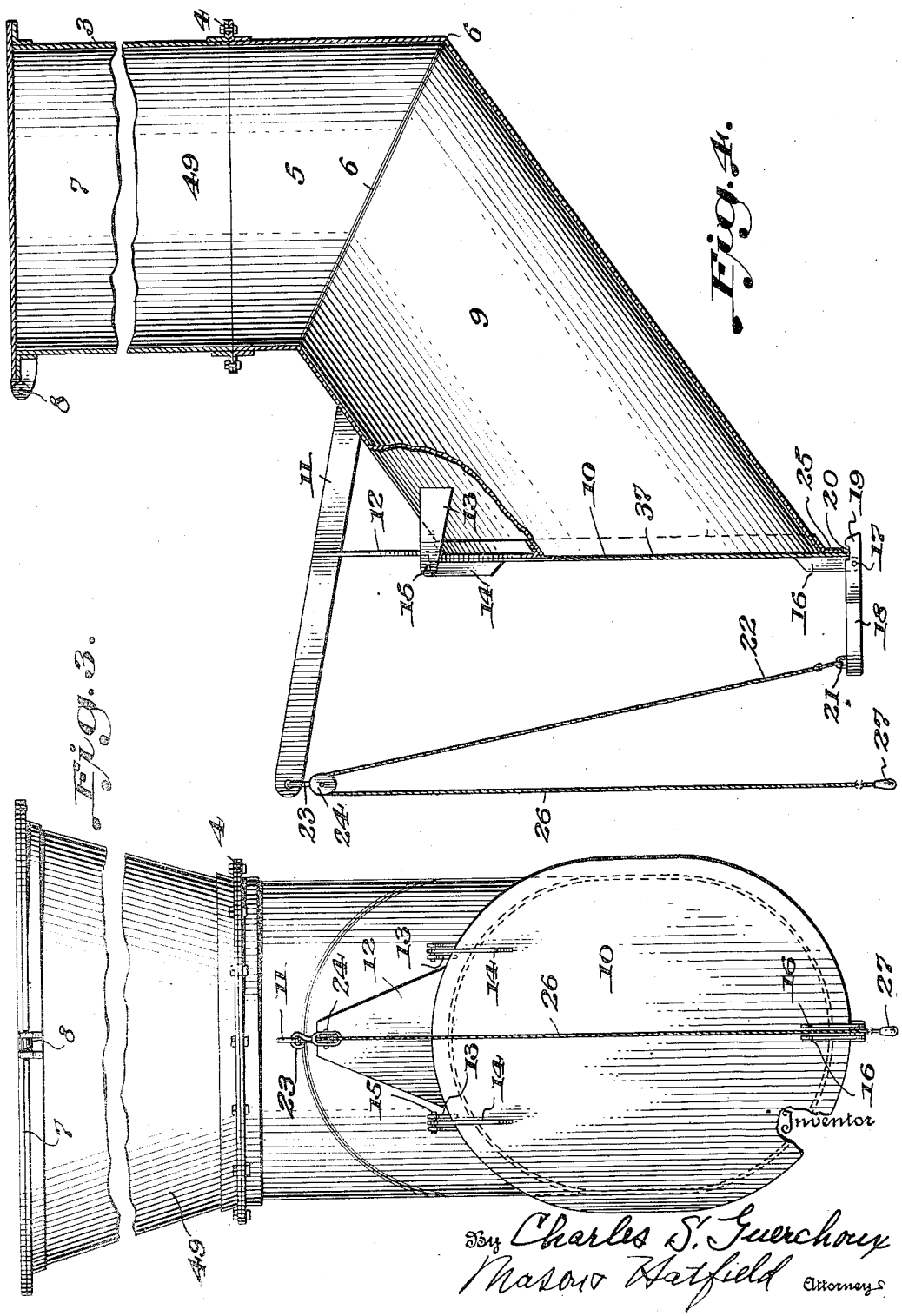

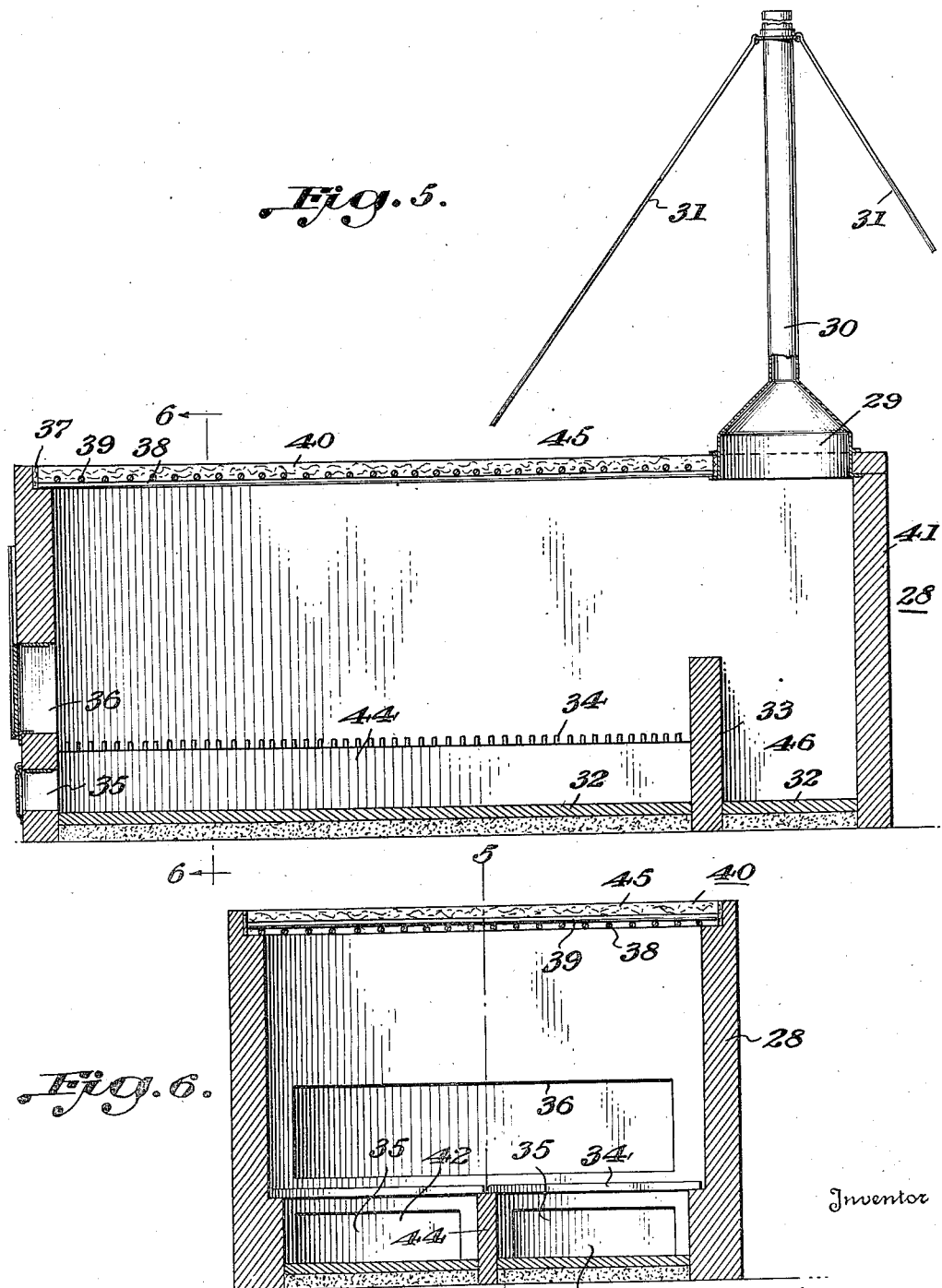

2,442,686

UNITED STATES PATENT OFFICE 2,442,686

MOBILE INCINERATOR, GARBAGE CONTAINER, AND CHUTE

Charles S. Guerchoux, New Orleans, La., assignor to The Ro-Ed Engineering Co., Inc., New Orleans, La., a corporation of Louisiana Application December 19, 1946, Serial No. 717,115

3 Claims. (Cl. 114—0.5)

This invention relates to a mobile incinerator, garbage container and chute, especially constructed and adapted for ships.

An object of the invention is to provide an incinerator for garbage, swill, trash, dunnage, mats, shavings, sawdust, oils of all descriptions, or contaminated stores, goods, dairy products, fish, vegetables, fruits, etc., and all other debris accumulated aboard vessels, which it is desired to dispose of before the vessel docks at a port.

A further object of the invention is to provide a means of disposal of contaminated goods, or goods that have been condemned by the U. S. health, State or city health authorities, whereby the aforementioned stores may be disposed of without contamination of the waters of the harbor in which the ship docks.

An additional object of the invention is to provide a means of disposal for contaminated products which will require a minimum of time and which will prevent entry into one country from another country of diseases of various kinds, insects, such as fruit flies, rodents, bacteria, etc.

A further object of the invention is to provide means on shipboard for the immediate disposition of contaminated goods, garbage, etc., by the provision of an incinerator mounted on a barge with means on the vessel whereby the goods may be quickly transferred to the incinerator on the barge for consummation by fire.

Further objects will appear hereinafter throughout the specification.

In the drawings:

Figure 1 is a perspective view of the apparatus of this invention.

Figure 2 is a plan view of the barge and the incinerator mounted thereon.

Figure 3 is an end elevation of the garbage chute.

Figure 4 is a side elevation of the garbage chute shown in Figure 3.

Figure 5 is a vertical section of the incinerator taken on the line 5—5 of Figure 6, and Figure 6 is a vertical transverse section taken on the line 6—6 of Figure 5.

Experience has demonstrated that ships from foreign ports very often are the source of bringing into this country from foreign countries diseases which in the past have been a menace to the health and welfare of its citizens. It is for this reason that health authorities of the government and of the state and city have made regular inspections of a ship before permitting the ship to dock. The present invention aims to eliminate the menace to the health of the citizens of this country by the provision of a garbage chute mounted on the side of the passenger liner or other vessel which has arrived from a foreign port. The vessel is met by a barge having an incinerator, so positioned that the incinerator may be moved directly below the exit of the chute whereby upon proper manipulation of the exit door of the chute the contents thereof may be deposited by gravity onto the upper surface of the incinerator.

In the drawings the foreign vessel is indicated by A and the barge by B. The vessel A is provided with a stern 1 and a rail 2. Conveniently located so as to overhang the stern 1 and preferably attached to the rail 2 is the receptacle chute 3. This receptacle chute comprises an upper vertically arranged section 49 of frusto-conical shape which is connected to a lower elbow section 5 by the coupling 4. The numeral 6 indicates the bend of the elbow and 9 the lower angled portion of the elbow. The upper section 49 is provided with a cover 7 which is pivotally attached at 8 to the section. The outlet of the lower portion is ordinarily closed by the door 10.

Fixedly attached to the lower portion is an arm 11 which is suitably braced by the plate 12. As seen in Figure 3, the door 10 is hingedly mounted to the lower angled portion by a pair of hinges, the leaves 13 of which are attached to the lower angle portion 9 on opposite sides of the plate 12, and by leaves 14 rigidly attached to the door. Each leaf 14 is hinged to a pair of leaves 13 by means of the pintle 15. Attached to the lower end of the door is a pair of shoulders 16. These shoulders are provided with a pintle 17 for supporting a pivoted latch 18 whose nose 19 is provided with a notch 20 adapted to engage the protruding end of the flange 25 mounted on the lower end of the lower angled section 9.

The latch 18 is provided with a loop 21 to which is tied the end of the cable 22. Hook 23, as seen in Figures 3 and 4, supports the pulley 24 over which the cable 22 is passed, and the free end 26 of this cable is provided with a handle 27. It will be understood that the length of this cable is such that an operator on the barge B may grasp the handle 27 for the combined purpose of releasing the latch 18 and pulling the door to an open position.

As can be noted from Figure 4 downward movement of the handle 27 causes the latch 18 to move on the pivot 17 in a clockwise direction thus freeing the notch 20 from the flange 25, further downward pull on the handle 27 causes the door 10 to move about the pivot 15, thus opening the door and permitting the contents of the chute or receptacle to move by gravity to the incinerator.

The incinerator shown in Figs. 1, 2, 5 and 6 is mounted on the barge B. It will be noted from these figures that the incinerator is ordinarily mounted on a barge which is adapted to come alongside the vessel to receive the contaminated foods, garbage, swill or other products that have been contaminated for immediate disposal by burning.

Vessels entering ports from countries that are restricted because of federal laws against hoof and mouth disease and several forms or species of fruit fly, beetle, etc., are provided with the receptacle noted in Figures 1, 3 and 4. If contaminated goods are found aboard the ship, upon inspection, the goods are immediately placed in the receptacle 1. As this chute is covered and will, in all probability, be sealed, it prevents exposure of the contaminated goods, the flies, rodents, insects, etc., as otherwise the goods would endanger public health.

The incinerator 28 consists, conveniently, of four vertical walls 41. There is an opening in the top 48 for the reception of the cap 29 of generally conical formation having a smokestack 30 in the center thereof, the smokestack being braced by a series of rods 31.

The interior of the incinerator consists of a floor 32, a fire back 33, as shown in Figures 5 and 6. The fire compartments 42 and 43 are located on either side of the fire back. The wall 44 separates the two compartments 42 and 43. Each of these compartments is provided with an auxiliary grid 34. The fuel may be fed to the fire compartments 42 and 43 by means of the openings 35. Access to the grill may be had through the opening 36. The top 40 includes a grill comprising a series of longitudinal rods or bars 38, the cross bars 39 being evenly spaced thereon and which extend transversely thereto, such bars constituting a grid means. These bars may be suitably attached to each other by welding, and they may be covered by the asbestos cement covering 45.

It will be noted by reference to Figure 5 that there are in reality three fire compartments, viz., compartments 42 and 43, which extend longitudinally of the incinerator as far as the fire back 33, and a third fire compartment 46 which extends transversely to the two first mentioned fire compartments and which is located between the fire back 33 and the rear wall 40, as seen in Figure 5.

It will also be noted that there are two incinerating surfaces 34 and 40. Should there be any overflow from the incinerating surface 40, such overflow may be shoveled through the door 36 onto the incinerating surface 34.

Prior practices have included the removal of all such garbage, swill, etc., by loading barges with the same and moving the barges to the city dump. This method exposed the citizenry, as well as the animal and plant life to the various and sundry diseases that could be contracted and spread by contact or exposure to the contaminated material.

The present method and apparatus completely eliminates any hazard whatever as the material need not be touched by human hands.

With the apparatus of the present invention there will be the usual inspection of the vessel by the Federal, State and/or city health authorities upon its arrival from a foreign port. Should any contagious disease be found, or should any contaminated goods be located the materials including the clothes of persons having diseases and/or the contaminated materials, after having been discovered upon inspection, would be placed immediately in the receptacle 1 aboard the vessel and kept sealed in this receptacle until the barge B came alongside. When the barge was suitably secured to the vessel with the incinerator located directly below the chute or receptacle 3, an operator would grasp the handle 27 attached to the end of the cable 26. Downward movement of the cable 26 would cause the release of the latch 18 and this would cause the opening of the door 10 and the contents would immediately by gravity move to the asbestos cover 45 through the opening 37, the goods would then be immediately consumed on this cover. It would be noted that the fire in the compartment 46 is the primary source of heat for the asbestos cover 45, and that the grills 34 are each heated by their individual fire compartments 42 and 43.

Having thus fully described my invention, it is to be understood that my invention is not to be limited by the specific illustration and description, but is of the full scope of the appended claims.

I claim:

1. For use with a ship having a chute mounted on a side of said ship, said chute having an exit extending beyond the side of the ship; a barge having a substantially unobstructed deck, an incinerator located on said deck in such position with regard to a side of the barge whereby said incinerator may be located directly beneath said chute when said barge has been maneuvered into proper position alongside said ship, said incinerator having an open top, a grill in said open top, said grill including a grid means of such size as to support the contents of said chute as said contents are discharged and are deposited by gravity onto the grill of said incinerator.

2. In combination, a ship, a chute mounted on a side of said ship, said chute having an exit extending beyond the side of the ship, a barge having a substantially unobstructed deck, said chute having an exit door with means for operating said exit door from said barge, an incinerator located on said deck in a position with regard to a side of the barge whereby said incinerator may be located directly beneath said chute when said barge has been maneuvered into proper position alongside said ship, said incinerator having an open top, a grill in said open top, said grill including grid means of such size as to support, under the impact of gravity, the contents of said chute upon operation of said exit door by said door operating means.

3. An apparatus in accordance with claim 1 in which the incinerator is provided with an auxiliary grid located beneath said first grid means, and a side door providing access to said auxiliary grid.

CHARLES S. GUERCHOUX.

REFERENCES CITED

The following references are of record in the file of this patent:

UNITED STATES PATENTS

| Number | Name | Date |
|--------|------|------|
| 183,015 | Milsom | Oct. 10, 1876 |
| 486,619 | Rossell et al. | Nov. 22, 1892 |
| 514,881 | Daniels | Feb. 13, 1894 |
| 1,610,558 | Lambert | Dec. 14, 1926 |
| 1,626,000 | Kay | Apr. 26, 1927 |
| 2,252,948 | Schadek | Aug. 19, 1941 |